Figure 1:
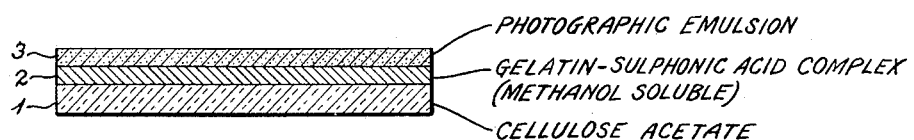

Oct. 24, 1950     J. A. H. HART ET AL     2,527,267
PHOTOGRAPHIC LAYERS CONTAINING GELATIN-SULPHONIC
ACID COMPLEXES, AND THEIR PREPARATION
Filed March 30, 1949

INVENTORS
JOHN ALFRED HENRY HART
KENNETH GEORGE ALFRED PANKHURST
ROBERT CHARLES MORRIS SMITH

BY *Stevens, Davis, Miller & Mosher*
ATTORNEYS

UNITED STATES PATENT OFFICE 2,527,267

PHOTOGRAPHIC LAYERS CONTAINING GELATIN-SULFONIC ACID COMPLEXES, AND THEIR PREPARATION

John Alfred Henry Hart, Ottawa, Ontario, Canada, and Kenneth George Alfred Pankhurst, Brentwood, and Robert Charles Morris Smith, Ilford, England, assignors to Ilford Limited, Ilford, England, a British company Application March 30, 1949, Serial No. 84,485
In Great Britain October 30, 1944

9 Claims. (Cl. 95—8)

This invention relates to the production of photographic materials.

It has now been discovered that complexes formed between gelatin and a sulphonic acid containing a highly hydrophobic radicle in the anion, are readily dispersible in organic solvents, e. g. methyl alcohol, and that the dispersions thus formed are suitable for coating gelatin layers in the production of photographic materials containing such layers. According to this invention, therefore, a method for coating a gelatin layer in photographic materials comprises coating on a supporting surface forming an element of such material a dispersion in which the solvent medium is predominantly organic, formed by dispersing in an organic solvent medium a complex formed by precipitating gelatin from its aqueous dispersion by means of a sulphonic acid containing a highly hydrophobic radicle in the anion. The term "sulphonic acid" is to be understood to include sulphonates.

The said acqueous dispersion is for preference at a pH value below the isoelectric point of the gelatin, but where the hydrophobic character of the anion is of a very high order, e. g. much higher than in the case of the simple napthalene sulphonic acids, the aqueous dispersion may be at a pH above the isoelectric point, though in using such conditions the presence of an inorganic electrolyte is frequently desirable. The precipitated complex may contain a small proportion of water and this be included in the organic solvent dispersion.

According to a further feature of the invention, there is included in an organic solvent dispersion so formed and used a proportion of another colloid which is soluble in the solvent medium already present, or which is soluble in a solvent medium which is miscible with the solvent medium already present, to form a stable combination.

The gelatin/sulphonate complexes may be prepared by the addition of the sulphonic acid or sulphonate solution to a solution of the gelatin and allowing the resulting precipitate to sediment out. The complexes may be dispersed in the organic solvent medium without washing, but it is preferred to wash the complex to remove unwanted ions. Instead of the sulphonic acid itself, it is preferred to use the corresponding soluble salts owing to the relative water-insolubility of the free acid. The quantity of the sulphonic acid or sulphonate employed, relative to the gelatin, may vary, but there is no advantage to be gained in using a quantity greater than the stoichiometric equivalent, i. e. about 10 mgm. moles per gram of dry gelatin.

Any sulphonic acid of which the alkali or ammonium salt is soluble in water and of which the anion is highly hydrophobic may be employed. These may be simple acids, for example naphthalene 2-sulphonic acid, napthalene 1.5-di-sulphonic acid, napthalene 1:3:5-tri-sulphonic acid, 2-naphthol-1sulphonic acid, 2-naphthol-6-sulphonic acid, 1-naphthol-4-sulphonic acid, 1-naphthol-3:6-disulphonic acid or anthraquinone-2-sulphonic acid, or may be more complex, for example dyestuffs such as Kiton Fast Yellow 3G (Colour Index No. 645) which contains a sulphoaryl-pyrazolone radicle, Naphthalene Orange GS (Imperial Chemical Industries Ltd.) and Tartrazine.

Generally speaking the most suitable organic solvents for dispersing the complexes are those containing hydroxy groups, e. g. methyl and ethyl alchols, ethylene glycol mono methyl ether, ethyl lactate and diacetone alcohol. Organic solvents not containing hydroxy groups are generally only useful together with some water or some hydroxy solvent, e. g. acetone, methyl ethyl ketone, dioxane, methylene chloride, chloroform and mesityl oxide are preferably used in admixture with water or methyl alcohol. Small quantities of esters, e. g. methyl acetate, butyl acetate, ethers, e. g. diethyl ether, and hydrocarbons, e. g. benzene and toluene, may also be included in the solvent medium. The choice of solvent will depend on the particular nature of the complex. Solubility in toluene and chloroform appears to increase the greater the quantity of sulphonate relative to gelatin. The complexes may be swollen in the organic solvent medium and dispersion is usually facilitated by gentle warming.

The following table shows examples of the preferred conditions for precipitating a gelatin/sulphonate complex using various sodium sulphonates.

| Sulphonic Acid (sodium salt) | Quantity added per gram of gelatin | Solubility characteristics of the precipitated complex | |
|---|---|---|---|
| | | Toluene | Aqueous Alcohol |
| | Grams | | |
| (a) naphthalene-2-sulphonic acid | 2.3 | s | vs |
| (b) naphthalene - 1.5 - disulphonic acid | 1.61 | s | vs |
| (c) naphthalene-1.3.5-trisulphonic acid | 1.44 | | ss |
| (d) 2-naphthol-6-sulphonic acid | 1.24 | | s |
| (e) 1-naphthol-3:6-disulphonic acid | 1.1 | | s |
| (f) Tartrazine | 0.01 | i | vs | s=soluble; vs=very soluble; ss=slightly soluble; i=insoluble.

Referring to this table, complex (a) in solution in aqueous alcohol is not precipitated by the addition of excess alcohol and this complex is also very soluble in carbon tetrachloride, acetone and ethyl acetate. Complex (b) in solution in aqueous alcohol is precipitated by the addition of excess alcohol and this complex is also soluble in ethyl acetate and very soluble in acetone; the same remarks apply to complex (c). Complex (e) in solution in aqueous alcohol is precipitated by excess alcohol, and complex (f) in solution in aqueous alcohol is precipitated by the addition of excess water.

In the tests referred to in this table the gelatin concentration was 0.5% and the temperature was 35° C. in each case.

As already indicated, an important feature of this invention is the formation of dispersions which comprise a gelatin/sulphonate complex dispersed in an organic solvent medium together with a proportion of another colloid soluble in such organic solvent medium or in an organic solvent medium miscible therewith. Such other colloids may be, for example, cellulose esters, e. g. cellulose nitrate, cellulose acetate, far-hydrolysed celluose esters (e. g. celulose acetate having an acetyl content of 20 to 30%), polyvinyl acetates, polyvinyl acetals, methyl methacrylate polymers, and the partial hydrolysis products thereof, alkyd resins, and mixed interpolymers such as the interpolymers of maleic acid or anhydride with styrene or methyl methacrylate.

The coating solutions obtained by the process of this invention may be employed for the formation of all types of colloid layers commonly present in photographic materials. They are of particular value in the formation of substrata serving to anchor a photographic emulsion layer to a hydrophobic colloid support such as cellulose nitrate or cellulose acetate film base. However, they may also be employed in the formation of anti-halation layers, in which case the solutions may contain a dye or pigment which absorbs light of the wavelength to which the photographic emulsion employed is sensitive; in the formation of filter layers, for example in the production of multi-layer materials for colour photography, in which case they should contain a colouring matter of the appropriate hue; in the formation of anti-abrasion super-coats, serving as an outer protection for the emulsion, in the formation of anti-static layers. and in the formation of colloid layers containing colour-former substances to be coated adjacent to photographic silver halide emulsion layers.

Where the coating solutions are to contain dyes, pigments (including colloidal silver), colour-formers and the like, these may in some cases be present in the original aqueous gelatin dispersion from which the gelatin/sulphonate complex is separated, since many of these substances, particularly pigments and particulate colour-formers, will separate with the complex. Alternatively they may be added at any subsequent stage in the preparation of the coating solution.

The following examples illustrate specific applications of the solutions of the complexes according to this invention:

EXAMPLE 1

*Subcoat solutions for application to cellulose acetate film base*

To 100 cc. of a 5% solution of gelatin was added 15 cc. of a 10% solution of naphthalene-2-sulphonic acid. The resulting precipitated complex was dissolved in 50 cc. of hot methyl alcohol, diluted with 110 cc. of methyl alcohol and 325 cc. acetone. Finally 0.25 cc. of 40% formaldehyde solution was added and the solution coated on cellulose acetate film base 1 to form a satisfactory substratum 2 for a subsequently applied gelatin photographic emulsion 3, as shown in Figure 1 of the accompanying drawing.

EXAMPLE 2

*Coloured filter layers*

(a) This example illustrates the use of a sulphonic acid dyestuff in the formation of the complex.

To 100 cc. of a 4% solution of gelatin purified by the process of British specification No. 558,262 was added 200 cc. of a 1% solution of Kiton Fast Yellow 3G. The precipitated complex was dissolved in 100 cc. of methyl alcohol and coated over a dried gelatin photographic emulsion layer. The dye did not penetrate the emulsion and and could be removed by washing in water before or after processing the emulsion.

Figure 2:
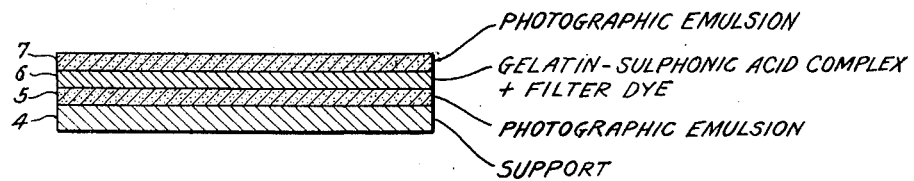

This technique is also of value in the formation of filter layers which lie between emulsion layers in multilayer photographic elements intended for colour photography. The resulting multilayer element is shown in Figure 2 of the drawing wherein support 4 is coated with photographic emulsion 5 which carries filter layer 6, comprising the gelatin-sulphonic acid complex plus the filter dye, which in turn supports the photographic emulsion 7.

EXAMPLE 3

*Solution for substrata and other uses*

50 grams of gelatin were melted in 5 litres of water to form a dispersion. To this was added 62 grams of sodium 2-naphthol-6-sulphonate in 2½ litres of water followed by 50 cc. of N hydrochloric acid, to bring the pH to about 2-3. The supernatant liquid was decanted off and the precipitated complex washed in 4 litres of water. The complex was dissolved in 500 cc. of hot alcohol.

The resulting solution, coated on cellulose acetate film base, dried, and then supercoated with an ordinary gelatino silver halide emulsion, afforded strong adhesion between the base and the the emulsion both in the dry condition and during the processing of the emulsion.

By adding a suitable dye to it, e. g. a small quantity of Acid Green G, it was suitable for coating as an antihalation layer on one side of cellulose acetate film base, carrying on the other side a panchromatic emulsion. It was also suitable for coating on the surface of a photographic emulsion to form an anti-abrasion or "non-stress" layer. By adding baryta to it the solution was suitable for forming a baryta coat on paper base intended to be subsequently coated with photographic emulsion.

The invention provides dispersions having a gelatin basis dispersed in organic solvent and the dispersions are therefore of value in a number of special applications. For example, they are of particular value for spray coating. Normal gelatin dispersions present considerable difficulties in spray coating since it is usually necessary to maintain the dispersion warm in the spray-gun to prevent it setting therein. Moreover, the ordinary gelatin dispersions will not adhere firmly if sprayed on to lacquered metal sheet. By the present invention, however, dispersions may be obtained which have little tendency to set in the spray-gun. Moreover, the organic solvent usually has a slight solvent action on lacquered surfaces and thus facilitates adhesion between such surfaces and the gelatin dispersion thereon. The spray-coating of lacquered metal sheets with photographic emulsion is of particular value in the production of photo-templates and the preliminary spray coating of such metal sheets with a gelatin dispersion according to this invention enable a strongly adherent subcoat to be obtained.

Another use to which the dispersions of this invention may be put is in the production of printing paper to be used for printing from wet negatives. The dispersions of this invention have a good resistance to water, though they are readily permeable by ordinary alkaline developing solutions. Paper coated with emulsion and supercoated with a gelatin dispersion according to this invention may be used for printing from wet negatives, though it is usually preferable to employ a dispersion containing a proportion of other colloids, e. g. cellulose nitrate and a methyl methacrylate-methacrylic acid co-polymer. Such dispersions not only have a good resistance to water, but also a good resistance to hypo which may be carried by the wet negative. Advantageously, in the production of wet-printing paper using the dispersions of this invention the emulsion itself should be a dispersion of a gelatin/silver halide/anion soap complex in organic solvent, as described in our co-pending application No. 623,445.

This application is a continuation-in-part of application Serial Number 623,446, filed October 19, 1945.

What we claim is:

1. A photographic element comprising a support bearing a sublayer consisting essentially of a complex of gelatin and a sulfonic acid containing a highly hydrophobic radical in the anion, which complex is soluble in a solution composed of methyl alcohol, said element having a light-sensitive silver halide emulsion layer contiguous with said sublayer.

2. A photographic element comprising a cellulose derivative support bearing a sublayer consisting essentially of a complex of gelatin and a sulfonic acid containing a highly hydrophobic radical in the anion, which complex is soluble in a solution composed of methyl alcohol, said element having a light-sensitive silver halide emulsion layer contiguous with said sublayer.

3. A photographic element comprising a cellulose derivative support bearing a sublayer consisting essentially of a complex of gelatin and a naphthalene sulfonic acid, which complex is soluble in a solution composed of methyl alcohol, said element having a light-sensitive silver halide emulsion layer contiguous with said sublayer.

4. A photographic element comprising a cellulose derivative support bearing a sublayer consisting essentially of a complex of gelatin and a naphthol sulfonic acid, which complex is soluble in a solution composed of methyl alcohol, said element having a light-sensitive silver halide emulsion layer contiguous with said sublayer.

5. A photographic element comprising a cellulose derivative support bearing a sublayer consisting essentially of a complex of gelatin and a sulfonic acid containing a highly hydrophobic radical in the anion, which complex is soluble in a solution composed of methyl alcohol together with a compatible hydrophobic colloid, said element having a light-sensitive silver halide emulsion layer contiguous with said sublayer.

6. A photographic element comprising a cellulose derivative support bearing a sublayer consisting essentially of a complex of gelatin and a sulfonic acid containing a highly hydrophobic radical in the anion, which complex is soluble in a solution composed of methyl alcohol together with cellulose nitrate, said element having a light-sensitive silver halide emulsion layer contiguous with said sublayer.

7. A photographic element comprising a cellulose derivative support bearing a sublayer consisting essentially of a complex of gelatin and a sulfonic acid containing a highly hydrophobic radical in the anion, which complex is soluble in a solution composed of methyl alcohol together with cellulose nitrate and a colloid containing free acid groups, said element having a light-sensitive silver halide emulsion layer contiguous with said sublayer.

8. A photographic element comprising a cellulose derivative support bearing a sublayer consisting essentially of a complex of gelatin and a sulfonic acid containing a highly hydrophobic radical in the anion, which complex is soluble in a solution composed of methyl alcohol, said element having a light-sensitive silver halide emulsion layer contiguous with said sublayer and a layer composed of said complex disposed on said emulsion layer.

9. A photographic element comprising a cellulose derivative support bearing a sublayer consisting essentially of a complex of gelatin and a sulfonic acid containing a highly hydrophobic radical in the anion, which complex is soluble in a solution composed of methyl alcohol, said element having a light-sensitive silver halide emulsion layer contiguous with said sublayer, said support also bearing a layer composed of said complex containing an antihalation dye.

JOHN ALFRED HENRY HART.
KENNETH GEORGE ALFRED PANKHURST.
ROBERT CHARLES MORRIS SMITH.

REFERENCES CITED

The following references are of record in the file of this patent:

UNITED STATES PATENTS

| Number | Name | Date |
| --- | --- | --- |
| 1,290,794 | Sheppard | Jan. 7, 1919 |
| 2,054,284 | Forstmann | Sept. 15, 1936 |
| 2,118,059 | Slack et al. | May 24, 1938 |
| 2,304,940 | Mannes et al. | Dec. 15, 1942 |
| 2,489,341 | Waller et al. | Nov. 29, 1949 |

FOREIGN PATENTS

| Number | Country | Date |
| --- | --- | --- |
| 556,360 | Great Britain | Oct. 1, 1943 |